Figure 1:
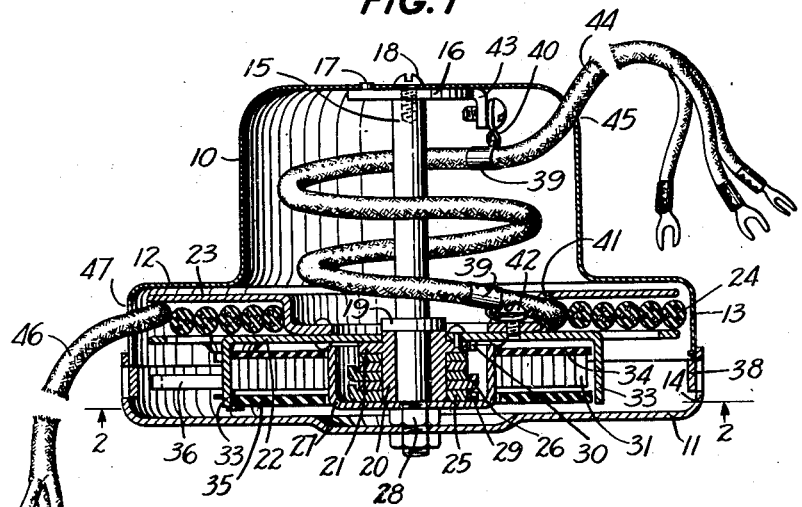

April 18, 1933.  F. A. HOYT  1,904,000

REELING DEVICE

Filed May 18, 1929

INVENTOR
F. A. HOYT
BY
Walter C. Kiesel
ATTORNEY

Patented Apr. 18, 1933

1,904,000

UNITED STATES PATENT OFFICE

FREDERICK A. HOYT, OF EAST ORANGE, NEW JERSEY, ASSIGNOR TO BELL TELEPHONE LABORATORIES, INCORPORATED, OF NEW YORK, N. Y., A CORPORATION OF NEW YORK

REELING DEVICE

Application filed May 18, 1929. Serial No. 364,146.

This invention relates to reeling devices and more particularly to reels for cords attached to telephones.

In the usual take-up device, such as cord reels, heretofore used in connection with electrical apparatus, the tension spring is controlled by the limits of the length of conductor unwound from the reel or the clutch mechanism for arresting the motion of the reel. This arrangement has certain disadvantages since a strain is placed on the connections of the conductor when the full length of the cord is unwound from the reel. When the cord is attached to a desk telephone or handset, it is desirable to have a definite short length of cord extending from the reel when the telephone or handset is not in use. Furthermore, this short length of cord must not be subjected to tension as would occur in the ordinary reel in which the weight of the telephone set exerts a tension on the cord extending from the reeling device.

An object of this invention is to automatically control the limits of travel of the conductor cord extending from the telephone set.

A feature of the invention relates to a cord reeling device assembled in such a manner that a sheave or reel is permitted to make a definite number of revolutions before its motion is arrested.

Another feature of the invention relates to a clutch mechanism to maintain the length of extended cord at a definite position without placing any strain on the cord conductor.

Another feature of the invention relates to arranging both ends of the cord exterior of the casing for connection to suitable apparatus without relying on wiping contacts or other electrical couplings within the cord reel.

In accordance with this invention the reeling device comprises a casing which encloses a tension spring attached to a rotatable sheave or reel on which the cord is wound. The reel is coupled to a shaft which carries a plurality of loose control members or discs having bent extensions which are successively engaged to automatically control the length of cord to be accommodated on the reel. This arrangement provides control means for winding or unwinding the cord to permit the sheave to make a definite number of revolutions before its rotation is arrested. A reciprocating pawl carried by the sheave engages projections on the casing to hold the reel in a definite position to relieve the strain on the cord and is readily disengaged to extend the cord further or rewinding the cord on the reel.

A continuation of the wound conductor on the sheave is housed in a hollow portion of the casing on one side of the sheave and comprises several spiral turns of conductor loosely surrounding the shaft, anchoring devices being provided to maintain the section of spiral turns in place within the hollow portion of the casing. This arrangement permits the use of a continuous cord without resorting to friction contacts between the sheave and the slack portion of the cord conductor extending to the stationary terminals of the telephone set.

Figure 2:
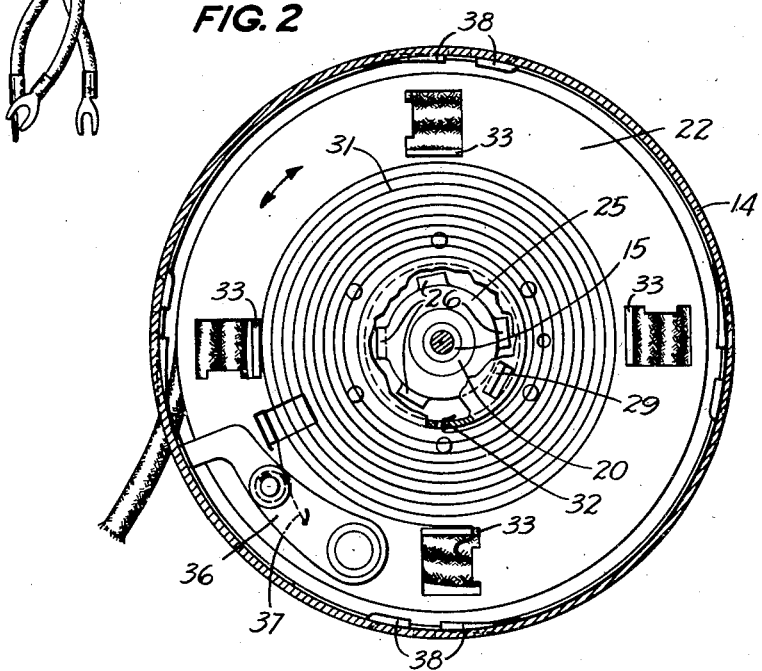

The various features of the invention are disclosed in the following detailed description and shown in the accompanying drawing in which:

Fig. 1 illustrates in cross section the assembly of the various elements embodied in a cord reel made in accordance with this invention; and Fig. 2 is a sectional view taken on the line 2—2 of Fig. 1 and illustrating in detail the peripheral clutch mechanism for stopping the reel at definite positions.

Referring to the drawing, the cord reeling device comprises a sheet metal pressed cup housing or casing formed of two parts 10 and 11. The cup portion 10 is formed into a cylindrical hollow casing having a peripheral flange portion 12 and a cylindrical rim portion 13. A cover plate 11 is provided with a cylindrical rim portion 14 which cooperates with the portion 13 of the cup housing to completely enclose the moving parts of the reeling device and forms a large diameter chamber for the cord reel and a chamber of smaller diameter for the slack portion of the cord.

A stationary shaft 15 coaxial with the two part housing is provided with an integral disc 16 having a projecting pin 17 which extends through the flat end of the cup portion of the casing. The positioning pin 17 and a screw 18 rigidly fasten the portion 10 to the shaft 15. A threaded portion of the shaft extends through the cover plate 11 and is provided with a nut to complete the housing assembly. The stationary shaft is also provided with a flange 19 which forms a seat for a cylindrical bearing 20 having a flange portion 21 surrounding the shaft within the large diameter chamber of the casing.

The sheave or reel comprises a metallic plate 22 and an annular flange 23, the plate 22 having an aperture to fit over the diameter of the bushing 20 and is rigidly attached to the bushing flange 21 by rivets. The annular flange 23 serves with the disc 22 as a seat for the overlying turns of a cord 24 to be wound thereon. A plurality of control members or metallic discs 25 having apertures to fit over the bushing 20 are loosely positioned on the bushing in superimposed relation with the bushing flange 21. Each of these discs is provided with a bent ear extension 26 which projects in the direction of the sheave. A metallic cup member 27 encloses the loose discs 25 and is rigidly fastened to the shaft by the nut 28. An inwardly projecting lug 29 on the cup adjacent the periphery of the end loose disc 25 forms a stop member for the projecting ear on this disc. A pin 30 on the sheave plate 22 forms a stop member for the projecting ear on the opposite end loose disc 25. A coiled tension spring 31 surrounds the cup member 27 and is anchored thereto as shown in Fig. 2 at 32. The other end of the tension spring is fastened to a struck-up lug 33 punched from the sheave plate 22. Similar lugs extend from the sheave at spaced positions to form a guard for the tension spring 31. A disc 34 intermediate the spring and the sheave and a similar disc 35 between the spring and the cover 11 prevent displacement of the spring when the sheave is rotated.

The reeling device may be constructed to accommodate any length of cord and the loose coupled controlling discs may be increased to any number depending on the number of turns of cord wound on the sheave. As illustrated five discs 25 surround the shaft 15 so that only five turns of cord may be wound on the sheave. In this arrangement the limits of the reeling and unreeling of the cord conductor may be determined accurately without special attention being given to the tension of the coiled spring 31. It will be seen that irrespective of the tension of the spring 31 the sheave or revolving reel will only rotate a definite number of turns, due to the successive coupling of the loose discs by means of the ear extensions. For instance, when the sheave is rotated the pin 30 strikes the projecting ear on the end disc 25 and rotates the loose disc until the succeeding discs are engaged by the projecting ears on the coupled discs. The rotation of the sheave is finally stopped when the projecting ear on the last loose disc strikes the stationary stop member 29.

It is often desirable to maintain a portion of the cord conductor unwound from the sheave, for instance, while a telephone instrument is in use, without however placing any strain on the conductor while in this condition. This is accomplished in accordance with this invention by providing a swinging pawl 36 attached to the sheave plate 22 and held under slight tension by a spring 37 to press the foot of the pawl against the inner surface of the rim of cover plate 11. The circular rim 14 of the cover plate is provided with pairs of risers 38 punched inwardly from the rim to form locking positions at spaced intervals around the inner circumference of the cover member. These risers are designed so that a rapid rotation of the sheave does not permit the pawl to drop into the notch. In order to lock the rotatable sheave in a definite position with the cord extended it is only necessary to allow the sheave to rotate slowly and the pawl will enter the notch formed between the risers 38. The pawl is easily disengaged from the notch by drawing the cord further and releasing to rewind the cord on the rotatable sheave.

The assembly of the casing facilitates the installation of the cord conductor since the cup-shaped portion 10 is easily removed without disturbing the other elements of the reeling device. Furthermore, the arrangement of the rotatable sheave in the casing forms a partition between the moving parts of the device and the cord chamber so that there is no danger from the tension spring. A suitable cord designed for the reeling device is provided with metallic collars 39, each having a swinging hook fastener 40. These collars are attached to the cord conductor at positions forming the section of the slack portion of the cord.

The cord may be installed in the device by drawing the long end through the aperture 41 in the annular flange 23 of the sheave until the collar 39 is adjacent the sheave. The hook fastener 40 may then be anchored by the screw 42 and several loose turns of the cord are wound around the shaft 14. The other collar and fastener are secured to the disc 16 by a screw extending through a bent extension 43 and the free end 44 of the cord extends through the hole 45 in the cup-shaped portion 10. The long length of cord is wound on the sheave as shown at 24 and the long end 46 extends through the aperture 47 in the rim 13 of the housing.

When the reeling device is in use and the cord attached to any desirable apparatus, such as a telephone set, the rotatable sheave will only revolve a definite number of revolutions depending on the number of controlling discs coupled to the sheave so that no strain is placed on the cord conductor. Similarly, when the cord is rewound on the sheave only a definite number of turns will be accommodated on the sheave due to the controlling discs 25 so that the telephone set does not exert a strain on the portion of the conductor extending from the reeling device.

What is claimed is:

1. A reeling device comprising a rotatable reel, a shaft for said reel, means for preventing movement of said reel along said shaft, a tension spring attached to said reel and shaft, and means including a plurality of interlockable members rotatable with said reel, carried by said shaft to automatically limit the rotation of said reel.

2. A reeling device comprising a casing, a stationary shaft extending through said casing, a rotatable sheave carried by said shaft and fixed relative to the length thereof, a tension spring connected to said shaft and sheave, and means within said spring rotatable about said shaft for limiting the tension of said spring on said sheave.

3. A reeling device comprising a casing, a shaft extending through said casing, a rotatable sheave carried by said shaft, means for preventing displacement of said sheave along said shaft, a tension spring connected to said shaft and sheave, and means including a plurality of cooperating members rotatable about said shaft, intermediate said spring and shaft for limiting the rotation of said sheave.

4. A reeling device comprising a casing, a shaft extending through said casing, a rotatable sheave carried by said shaft, a tension spring coupled to said shaft and sheave, and multiple discs loosely surrounding said shaft intermediate said shaft and spring, said discs being interlockable by rotation to limit the rotation of said sheave.

5. A reeling device comprising a casing, a shaft extending through said casing, a rotatable sheave carried by said shaft, a cup member rigidly fastened to said shaft, a tension spring connected to said sheave and cup member, and interlocking members for controlling the rotation of said sheave within said cup member.

6. A reeling device comprising a casing, a stationary shaft extending through said casing, a rotatable sheave carried by said shaft, a cup member attached to said shaft, projections on said sheave and cup member, and loosely mounted members on said shaft having interlocking ears, the ears on certain of said members engaging said projections.

7. A reeling device comprising a casing, a shaft extending through said casing, a rotatable sheave carried by said shaft, a tension spring connected to said shaft and rotatable sheave, a projection on said sheave, a stop member on said shaft, and a stack of loosely mounted members on said shaft having interlocking ears, the ears of the end members of said stacks engaging said projection and stop member respectively, and the intermediate members of said stack interlocking in series rotation with said end members to limit the rotation of said sheave.

8. A reeling device comprising a casing, a shaft extending through said casing, a rotatable sheave carried by said shaft, a plurality of stacked loose discs carried by said shaft, said discs having upturned ears, a projection on said sheave engaging the upturned ear of one of said discs for one revolution, the other discs successively coupling with said first disc, and stopping means engaging the last disc to arrest the rotation of said sheave.

9. In a reeling device, a casing comprising a cup-shaped portion and a cover portion, a shaft in said casing connecting said portions together, a rotatable sheave carried by said shaft, a tension spring attached to said shaft and sheave, means for limiting the rotation of said sheave, and a flexible cord adapted to be wound on said sheave, said cord having a plurality of turns encircling said shaft defining a fixed length of cord in said cup-shaped portion of said casing.

10. In a reeling device, a casing comprising a cup-shaped portion and a cover portion, a shaft in said casing connecting said portions together, a rotatable sheave carried by said shaft, a tension spring attached to said shaft, means for limiting the rotation of said sheave, a flexible cord adapted to be wound on said sheave, said cord having a plurality of turns loosely encircling said shaft in said cup-shaped portion, and means for anchoring the loose turns of said cord to said sheave and shaft.

11. In a reeling device, a casing comprising a cup-shaped portion and a cover portion, a shaft in said casing connecting said portions together, a rotatable sheave carried by said shaft, a tension spring attached to said shaft and sheave, bent projections in spaced relation on the inner surface of said cover portion, and a pawl carried by and pivoted on said sheave for engaging said projections when said sheave is rotated at low speeds and adapted to slide over said projections when said sheave is rotated at high speed.

12. A reeling device comprising a shaft, a reel rotatably mounted on said shaft, a tension spring connected to said shaft and reel, and means including a plurality of interlockable members mounted on said shaft and rotatable by said reel for limiting the rotation thereof.

13. A reeling device comprising a stationary shaft, a sheave rotatably mounted on said shaft, stop members attached to said shaft and sheave, and means cooperating with said stop members and rotatable by one of said stop members for limiting the rotation of said sheave.

14. A reeling device comprising a stationary shaft, a sheave rotatably mounted on said shaft, means for locking said sheave relative to the length of said shaft, a stop member carried by said shaft, and means rotatable by said sheave cooperating with said stop member for limiting the rotation of said sheave.

15. A reeling device comprising a casing, a shaft extending through said casing, a rotatable sheave carried by said shaft, a plurality of discs loosely mounted on said shaft having interlocking ears, and means on said shaft and sheave cooperating with certain of the ears on said discs to limit the rotation of said sheave.

In witness whereof, I hereunto subscribe my name this 17 day of May, 1929.

FREDERICK A. HOYT.